(12) United States Patent
Chu

(10) Patent No.: US 11,833,002 B2
(45) Date of Patent: Dec. 5, 2023

(54) CAD/CAM MACHINABLE BLOCK FOR MANUFACTURING A DENTAL PROSTHETIC ELEMENT

(71) Applicant: SOCIETE DE RECHERCHES TECHNIQUES DENTAIRES, Saint Egreve (FR)

(72) Inventor: Manh-Quynh Chu, Fontanil Cornillon (FR)

(73) Assignee: SOCIETE DE RECHERCHES TECHNIQUES DENTAIRES, Saint Egreve (FR)

( * ) Notice: Subject to any disclaimer, the term of this patent is extended or adjusted under 35 U.S.C. 154(b) by 0 days.

(21) Appl. No.: 17/447,660

(22) Filed: Sep. 14, 2021

(65) Prior Publication Data
US 2022/0079723 A1    Mar. 17, 2022

(30) Foreign Application Priority Data
Sep. 15, 2020    (FR) ........................................ 2009357

(51) Int. Cl.
*A61C 13/00* (2006.01)
*A61C 5/73* (2017.01)
*A61C 13/09* (2006.01)

(52) U.S. Cl.
CPC ............ *A61C 13/0006* (2013.01); *A61C 5/73* (2017.02); *A61C 13/0004* (2013.01); *A61C 13/09* (2013.01)

(58) Field of Classification Search
None
See application file for complete search history.

(56) References Cited

U.S. PATENT DOCUMENTS

| 5,990,195 | A | * | 11/1999 | Arita | A61K 6/887 |
| | | | | | 523/209 |
| 2018/0360575 | A1 | * | 12/2018 | Reynaud | A61C 5/73 |

FOREIGN PATENT DOCUMENTS

| DE | 102006051294 A1 | 4/2008 | |
| EP | 0040165 A1 | 11/1981 | |
| EP | 2692312 A1 | 2/2014 | |
| EP | 2839807 B1 | 2/2015 | |
| EP | 3386428 B1 * | 1/2020 | ......... A61C 13/0004 |
| FR | 3019461 A1 | 10/2015 | |
| WO | 2008/083358 A1 | 7/2008 | |
| WO | 2009/070470 A1 | 6/2009 | |
| WO | 2017/098096 A1 | 6/2017 | |

OTHER PUBLICATIONS

French Search Report for FR 2009357 dated Apr. 13, 2021.

* cited by examiner

*Primary Examiner* — Elizabeth Collister
(74) *Attorney, Agent, or Firm* — Heslin Rothenberg Farley & Mesiti P.C.

(57) ABSTRACT

The present invention relates to a block (1) for the CAD/CAM machining of a dental prosthetic element:
- an insert (2) wherein the dental prosthetic element is intended to be machined,
- a polymeric layer (5) covering at least one surface of the insert,
- a mandrel (6) fixed to the insert (2), characterised in that the insert (2) comprises two parts (3, 4) connected to one another, of which:
- a first part (3) intended to be machined to form an inlay-core, said first part comprising a composite material comprising one-directional reinforcing fibres, (Continued)

a second part (4) intended to be machined to form a crown, said second part having no reinforcing fibres and comprising a material comprising one or more mineral fillers.

20 Claims, 2 Drawing Sheets

CAD/CAM MACHINABLE BLOCK FOR MANUFACTURING A DENTAL PROSTHETIC ELEMENT

CROSS REFERENCE TO RELATED APPLICATIONS

This application claims priority to French Application No. 2009357, filed on Sep. 15, 2020, the entire contents of which are hereby incorporated herein by reference.

Technical Field of the Invention

The present invention relates to a block intended for CAD/CAM machining machines, or more generally a CAD/CAM machinable support block for manufacturing a particular dental prosthetic element, namely an inlay-core (comprising as a combination, a post and a core build-up) surmounted by a crown.

Technological Background

The machining of dental prosthetic elements, specifically crowns, bridges by CAD/CAM (Computer-Assisted Design and Manufacture) from the preform is fully known. This technology has for example been described in document EP 0 040 165. The technology has since developed, both on CAD/CAM equipment, and on the composition of preforms.

There are mainly 2 types of preforms.

The first type of preform is presented in the form of "blocks", generally parallelepiped in shape. In the case, the blocks are fixed to the articulated arm exposing the preform to the machining tool, by way of a mandrel integral with the block. It is this type of preform that the invention relates to.

Document EP 2 692 312 A1 describes, for example, a preform intended for manufacturing posts and crowns, being mainly presented in the form of a fibrous structure covered over part of its surface with a composite semi-transparent layer, for example made of polymer. The fibres are presented in the form of flat or wavy layers, or thus curved. The second type of preform is presented in the form of a "disk" within which the prosthetic elements are machined. In this case, the disk does not have any specific arrangement allowing to fix it onto the articulated arm. It is simply positioned in an imprint of its shape that the articulated arm presents.

The inlay-core is made of one part constituted by a post surmounted by a core build-up. It is made of metal, more rarely of ceramic. It is formed of one single part, reason for which it is called "inlay-core or post & core". It is therefore made of one same material. The inlay-core serves as a support for a pulpless tooth reconstitution.

Regarding manufacturing, metal inlay-cores can be obtained by so-called lost-wax casting technique in the prosthetics laboratory or more rarely, by CAD/CAM machining from a steel or titanium disk.

There are also fibrous inlay-cores, which can be machined from a disk of the type of that mentioned above, and such as described in document EP 3386428 A1, wherein air cells are formed. Each air cell is filled with a composite material wherein vertical fibres are buried. The CAD/CAM machine directly machines inlay-cores made of composite material.

In the case where it is sought to reconstitute a complete tooth made of composite material, it is necessary to use two separate CAD/CAM blocks, namely a first CAD/CAM block to be machined to manufacture the inlay-core, and a second CAD/CAM block to be machined to manufacture the crown. Then, each of these two blocks are machined separately. The manufacturing of the dental prosthetic element is therefore long and cumbersome.

In addition, the manufacturing of the dental prosthetic element requires two visits from the patient to the practitioner: a first visit to take a first imprint in view of manufacturing and positioning the inlay-core, and a second visit to take a second imprint in view of manufacturing and positioning the crown on the core build-up of the inlay-core, which requires time for the patient and for the practitioner, and represents a high cost.

Document DE 102006051294 A1 describes a CAD/CAM block comprising an insert on which a mandrel is fixed. The insert allows to manufacture inlays, onlays, facets, crowns, partial crowns, bridges or bridge parts (see [23]). According to the embodiment described [36], the insert of FIG. 1 has an elastic module close to that of enamel and is the only one to contain fibres (see FIG. 9). In the other embodiments illustrated, the insert contains 2 separate zones, one of which is the elasticity module being close to that of dentine and another of which is the elasticity module being close to that of enamel.

Document WO 2009/070470 A1 describes a block for CAD/CAM machining equipped with a mandrel and wherein the insert comprises two material layers, respectively an internal material similar to dentine and an external material similar to enamel, the assembly being covered with an external layer. When the materials comprise fibres, these are in a proportion less than 20% by weight. The insert is intended for manufacturing crowns, bridges, inlays and onlays.

Document FR 3019461 A1 describes preforms intended for manufacturing crowns or bridges comprising the superposition of several fibre-based materials, the highest material being covered with a fibre-free suprastructure. The preform does not allow the manufacturing of an inlay-core surmounted by a crown.

Document EP2839807 A1 describes a dental prosthesis for the complete replacement of the dental arch. In practice, transverse fibres are buried in a thermally-crosslinkable resin. This is not an insert in the sense of the invention associating an individualised inlay-core surmounted by a crown.

BRIEF DESCRIPTION OF THE INVENTION

An aim of the invention is to propose a CAD/CAM block which can be fixed to a CAD/CAM machining machine, in particular by way of a mandrel integral with the block, which allows to machine both an inlay-core and a crown, together forming a dental prosthetic element, in one single machining operation.

The invention also aims to provide a dental prosthetic element comprising an inlay-core and a crown, by CAD/CAM machining one single CAD/CAM block, in order to make the manufacturing of such a dental prosthetic element simpler, quicker and cheaper.

To this end, the invention proposes a block for CAD/CAM machining a dental prosthetic element, said block comprising:
  an insert wherein the dental prosthetic element is intended to be machined,
  a polymeric layer covering at least one surface of the insert,
  a mandrel fixed to the insert.

The block is mainly characterised in that the insert comprises two parts connected to one another, of which:

a first part intended to be machined to form an inlay-core, said first part comprising a composite material comprising one-directional reinforcing fibres, a second part intended to be machined to form a crown, said second part having no reinforcing fibres and comprising a material comprising one or more mineral fillers.

The insert of the block according to the invention, intended to be machined to manufacture a dental prosthetic element, is presented in the form of one single part, wherein the first and the second part of the insert are fixedly connected to one another, at least by one of their respective faces.

The first and second parts of the insert can be connected directly, i.e. that they are in contact with one another, at least by one of their respective faces. In this case, and preferably, the first part or the second part of the insert comprises a polymer in crosslinked form, i.e. that it forms a rigid polymeric network. This crosslinked polymer allows to fix the two parts of the insert to one another. More specifically, the first and second parts of the insert are first put into contact with one another, then the polymer(s) of the first part and/or of the second part are crosslinked in order to form a rigid connection between the two parts, at the level of which the crosslinked network confines the remainder of the first part and/or of the second part of the insert.

Alternatively, the first and second parts of the insert can be indirectly connected, i.e. that they are not in direct contact with one another, but separated from one another by an intermediate adhesive layer. The adhesive layer can be, for example, a glue, a dental cement, or a polymer, that it is positioned between the first and second parts of the insert, in order to glue them to one another.

As indicated above, the block of the invention is presented in the form of one single part comprising the two parts of the coated insert in the polymeric layer. The machining of the block of the invention thus allows to machine both the first part and the second part of the insert to form the inlay-core and the crown, in one single machining operation, contrary to the state of the art where usually two separate blocks are machined, one of which allows to produce the inlay-core and the other, the crown. This represents a saving of time and of significant resources, which highly reduces the associated manufacturing costs.

In addition, thanks to the block of the invention, one single visit of the patient to the practitioner is necessary to take the imprints in view of manufacturing and positioning the inlay-core and the crown forming the dental prosthetic element, which reduces the associated time and costs, both for the patient and for the practitioner.

According to other aspects, the block for CAD/CAM machining according to the invention has the following different characteristics taken individually or according to their technically possible combinations:

the first part of the insert is glued to the second part of the insert by an adhesive layer arranged between said first and second parts;

the material of the first part and/or of the second part of the insert comprises a crosslinked material, said first and second parts being fixed to one another by said crosslinked polymer;

the reinforcing fibres of the first part of the insert are longitudinal;

the material of the first part of the insert is a composite material comprising at least one polymer, and the one-directional reinforcing fibres are buried in said polymer;

the polymer(s) of the composite material of the first part of the insert is chosen from among the following polymers: epoxy, polyester, vinylester, acrylic resin, methacrylic resin, and their mixtures;

the one-directional reinforcing fibres of the material of the first part of the insert are chosen from among: glass fibres, quartz fibres, silica fibres, and their mixtures;

the one-directional reinforcing fibres of the material of the first part of the insert represent between 50% and 85% by weight with respect to the weight of said material of the first part of the insert;

the material of the second part of the insert is a composite material comprising at least one polymer and mineral fillers buried in said polymer;

the polymer(s) of the composite material of the second part of the insert is chosen from among the following polymers: acrylic resin, methacrylic resin, and their mixtures;

the material of the second part of the insert is a ceramic material;

the mineral fillers of the material of the second part of the insert are chosen from among: silica, glass, ceramic, radio-opaque particles, and their mixtures;

the fillers of the material of the second part of the insert represent between 50% and 85% by weight with respect to the weight of said material of the second part of the insert;

the polymeric layer is made of a material comprising:
*a thermosetting polymer chosen from the group comprising: polyurethane (PU), methacrylic resin, acrylic resin and their mixtures, or
*a thermoplastic polymer chosen from the group comprising: polycarbonate (PC), polyoxymethylene or polyacetal (POM), polymethylmethacrylate (PMMA), polyurethane (PU), polyamide (PA), and their mixtures.

the material of the polymeric layer comprises glass fibres;

glass fibres of the material of the polymeric layer represent 10% to 50% by weight with respect to the weight of said material of said polymeric layer;

the mandrel can be preferably made of metal, made of composite material, or made of the same material as that of the polymeric layer.

Another aim of the invention is a dental prosthetic element comprising:

an inlay-core, comprising a composite material comprising one-directional reinforcing fibres, a crown, with no reinforcing fibres, comprising a composite material comprising one or more mineral fillers, the dental prosthetic element being prefabricated.

The dental prosthetic element is preferably obtained by machining the CAD/CAM block described above, in one sole and single machining operation. The machining of the first part of the insert allows to obtain the inlay-core, and the second part of the insert allows to obtain the crown. The material of the inlay-core corresponds therefore to the material of the first part of the insert, and the material of the crown corresponds therefore to the material of the second part of the insert. These materials have already been described above, and will not therefore be repeated below.

The expression "prefabricated dental prosthetic element" means that the dental prosthetic element is manufactured in one piece in one single assembly comprising the inlay-core and the crown, and this, before being positioned in the patient's mouth. In other words, from the machining of the insert, a dental prosthetic element which is already assembled is obtained, without it being necessary to subsequently assemble the inlay-core with the crown during the positioning of the dental prosthetic element in the patient's mouth.

In other words, the invention also aims for a one-piece dental prosthetic element comprising an inlay-core, comprising a composite material comprising one-directional reinforcing fibres, said inlay-core being surmounted by a crown, with no reinforcing fibres, and comprising a material comprising one or more mineral fillers.

The invention further relates to a method for manufacturing a dental prosthetic element, comprising the following steps:
providing a block such as described above,
CAD/CAM machining of the block to obtain the dental prosthetic element.

The invention also relates to a dental prosthetic element comprising an inlay-core and a crown connected to one another, said dental prosthetic element being obtained by the manufacturing method above.

DESCRIPTION OF THE FIGURES

Other advantages and characteristics of the invention will appear upon reading the following description given as a non-limiting, illustrative example, in reference to the following appended figures.

DETAILED DESCRIPTION OF EMBODIMENTS OF THE INVENTION

Figure 1:
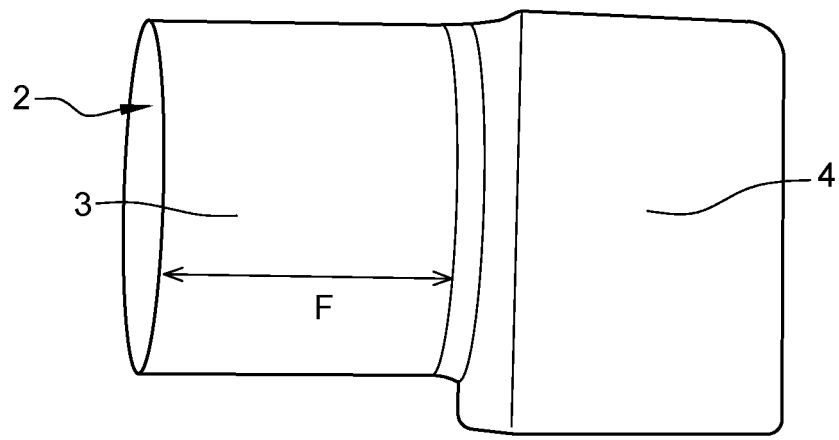
FIG. 1 is a photograph of an insert comprising two parts connected to one another, of which a first part is intended to form an inlay-core after machining, and a second part is intended to form a crown after machining.

The invention relates to a block for the CAD/CAM machining of a dental prosthetic element. Such a block is intended to be machined to manufacture a dental prosthetic element comprising an inlay-core and a crown.

In reference to FIGS. 1, 2, 3A, and 3B, the block 1 comprises an insert 2 comprising two parts, of which a first part 3 and a second part 4.

A mandrel 6 is fixed to a face of the block 1, preferably facing the first part of the insert 2. The mandrel 6 allows to fix the block 1 to a machining machine for machining said block.

The insert 2 is one-piece, also called one single holding, in that the first and the second part 3, 4 are rigidly connected to one another, at least by one of their respective faces, so as to form one single assembly. The machining of the insert in CAD/CAM therefore involves machining, in one same machining operation, the first part and the second part of the insert, to manufacture the dental prosthetic element. This will be explained in more detail below in the present text.

The first part 3 of the insert is intended to form, after machining, the inlay-core of the dental prosthetic element. It is presented preferably in the form of a cube, of a rectangular parallelepiped, of a cylinder, or of a cone for example, of which the length, i.e. its largest dimension, is preferably substantially perpendicular to the length of the second part 4 of the insert 2.

The first part 3 of the insert comprises a composite material. This composite material comprises one-directional reinforcing fibres.

Polymers constituting the composite material are preferably chosen from among the following polymers: epoxy, polyester, vinylester, acrylic resin, methacrylic resin, and their mixtures.

The reinforcing fibres of the composite material of the first part 3 of the insert are long and one-directional fibres. By "long", this means that the fibres have a length corresponding to that of the inlay-core, generally 5 to 20 mm. These fibres are called "one-directional" in that they extend in one single direction, that of their length, disregarding their thickness.

The reinforcing fibres are buried in the composite material.

Within the block 1, the reinforcing fibres extend substantially perpendicularly to the second part 4 of the insert 2, as illustrated by the double arrow F in FIG. 1.

The reinforcing fibres are preferably chosen from among glass fibres, quartz fibres, silica fibres, and their mixtures.

The reinforcing fibres represent preferably up to 85% by weight with respect to the weight of the composite material of the first part 3 of the insert 2.

The second part 4 of the insert is intended to form, after machining, the crown of the dental prosthetic element. It is presented preferably in the form of a cube, of a rectangular parallelepiped, or of a cylinder for example, of which the length, i.e. its largest dimension, is preferably substantially perpendicular to the length of the first part 3 of the insert 2.

According to a preferred embodiment, the reinforcing fibres extend along the length of the first part 3 of the insert. The reinforcing fibres are advantageously perpendicular to the length of the second part 4 of the insert. The first and second parts 3, 4 of the insert thus form a "T".

Figure 2:
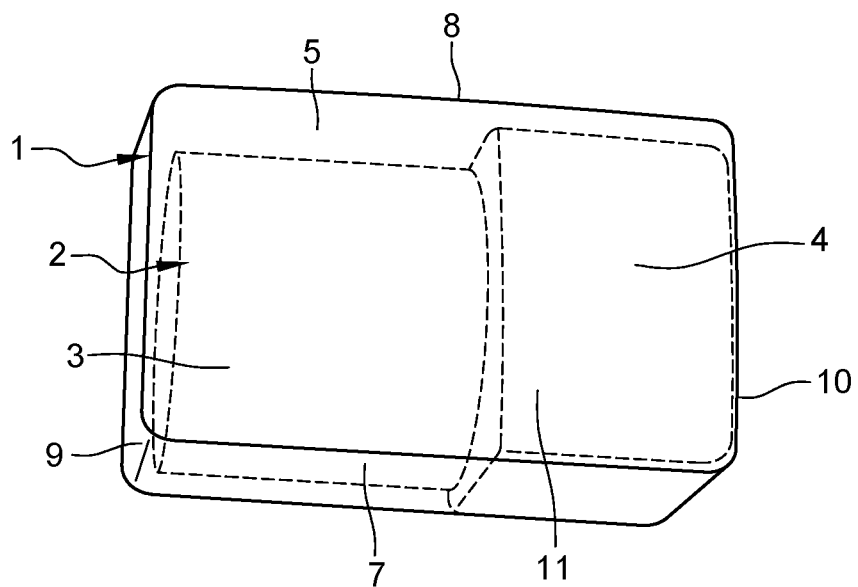
FIG. 2 is a photograph of a CAD/CAM block, comprising the insert of FIG. 1 covered on each of its faces by a polymeric layer.
Figure 3A:
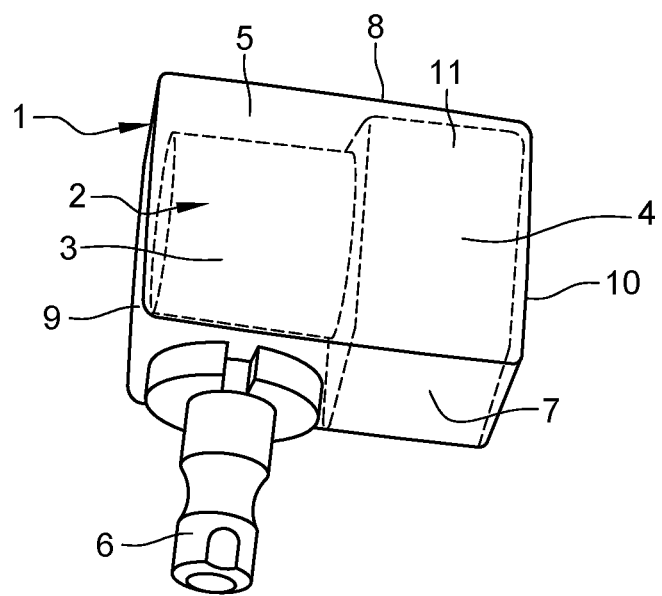
FIG. 3A is a photograph of the block of FIG. 2, to which is fixed a mandrel facing the first part of the insert.
Figure 3B:
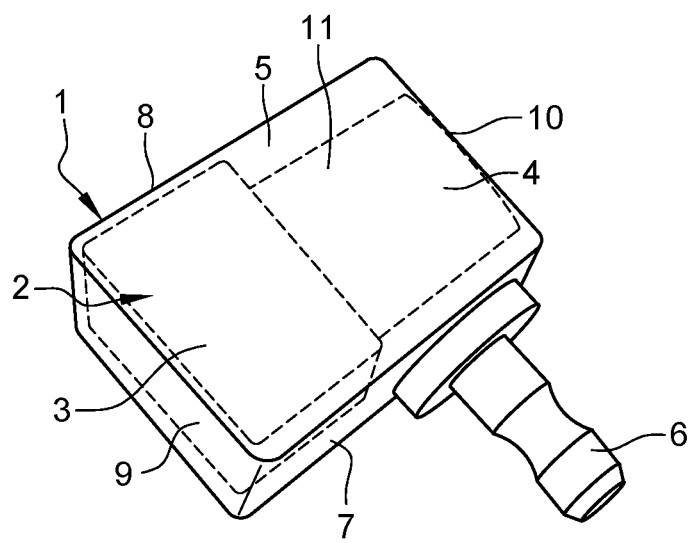
FIG. 3B is a photograph of the block of FIG. 3A according to a different and close view.

In FIGS. 1, 2, and 3, the first part 3 of the insert has a cylindrical shape, and the second part 4 of the insert has a rectangular parallelepiped shape. The first part 3 and the second part 4 of the insert are perpendicular to one another, thus forming a "T".

The second part 4 of the insert comprises a non-fibrous material, i.e. with no fibres. This material comprises a matrix and mineral fillers.

According to an embodiment, the matrix of the second part 4 of the insert is a polymeric matrix comprising one or more polymers. These polymers are preferably chosen from among the following polymers: acrylic resin, methacrylic resin, and their mixtures.

The fillers allow to provide specific properties to the crown obtained after machining, such as the adjustment of the colour, the adjustment of the shininess, the solidity, or also the mechanical strength.

The fillers are preferably chosen from among: silica, glass, ceramic, radio-opaque particles, and their mixtures.

The fillers represent preferably up to 85% by weight with respect to the weight of the composite material of the second part 4 of the insert 2.

The insert further comprises a polymeric layer 5 which covers at least one surface of the insert.

When the mandrel 6 is mounted on the block 1, said mandrel is fixed onto one of the faces of the block, in contact with the polymeric layer 5.

More specifically, the polymeric layer 5 covers both the first part 3 and the second part 4 of the insert 2. It can cover one or more faces of the insert. One face of the insert 2 comprises a face of the first part 3 and a face of the second part 4 adjacent to said face of the first part 3. The polymeric layer 5 therefore covers at least one face of the first part 3 of the insert and the adjacent face of the second part 4 of the insert.

The polymeric layer 5 covers at least the face 7 of the block 1 on which the mandrel 6 must be fixed, and allows to form a screen between the mandrel and the first part 3 of the insert, which avoids damaging the structure of said first part 3 of the insert.

The polymeric layer 5 can cover one or more faces of the insert 2. In any case, the polymeric layer 5 is advantageously overmoulded on the insert 2.

Preferably, the polymeric layer 5 covers all of the insert 2, i.e. all of the free faces of the insert 2, such that the insert is buried in the polymeric layer.

Advantageously, the polymeric layer 5 covers the insert 2 such that the block 1 (excluding mandrel) has a cubic or parallelepiped shape. The mandrel 6 projects from a face of the cube or of the parallelepiped. Such a cubic or parallelepiped shape is a simple shape with well-defined and regular surfaces, which facilitates the machining of the block by CAD/CAM by the machining machine.

In practice, excluding mandrel, the polymeric layer 5 represents between 10% and 50% by weight of the total weight of the block.

Preferably, the polymeric layer 5 is made of a material comprising a thermosetting polymer. The thermosetting polymer is preferably chosen from among polyurethane (PU), a methacrylic resin, an acrylic resin, and their mixtures.

Alternatively, the polymeric layer 5 can be made of a material comprising a thermoplastic polymer. The thermoplastic polymer is preferably chosen from among polycarbonate (PC), polyoxymethylene or polyacetal (POM), polymethylmethacrylate (PMMA), polyurethane (PU), polyamide (PA), and their mixtures.

The material of the polymeric layer 5 preferably comprises reinforcing fibres, in particular glass fibres. When they are present, glass fibres represent advantageously 10% to 50% by weight of the weight of the material of the polymeric layer.

The invention also relates to the use of the block 1 described above for machining a dental prosthetic element comprising an inlay-core and a crown.

More specifically, the first part 3 of the insert of the block 1 is CAD/CAM machined to form the inlay-core, and the second part 4 of the insert of the block 1 is CAD/CAM machined to form the crown. The crown is fixed onto the core build-up of the inlay-core.

From machining the two parts 3, 4 of the insert, the inlay-core and the crown obtained are from one single holding, i.e. that they form one single part adapted to be positioned and fixed in a cavity of the patient's teeth.

Preferably, whatever the type of insert, the latter undergoes, before being machined, a mechanical treatment of the sanding type, in order to obtain a rough surface favouring adhesion with the polymeric layer. If necessary, a physico-chemical treatment of the plasma-silanisation type can be applied on the insert.

Another aim of the invention is a method for manufacturing a block such as described above.

The manufacturing method comprises the following steps:
  implementation of a mould comprising at least one hollow part,
  positioning of the insert 2 previously made in the mould,
  injection of a polymeric material into the mould, in order to cover at least one surface of the first part 3 of the insert and at least one adjacent surface of the second part 4 of the insert, to form the block 1,
  demoulding of the block 1.

The method is preferably carried out according to the two following embodiments.

According to a first embodiment, the insert provided is presented in two separate parts: the first part 3 and the second part 4 are separate from one another.

The first and second parts 3, 4 of the insert 2 are positioned in the mould, preferably in two separate hollow parts in fluid connection with one another or in one single hollow part of the mould.

The polymeric material is injected into the mould, in order to cover at least one surface of the first part 3 of the insert and at least one adjacent surface of the second part 4 of the insert.

During casting, the polymeric material is also inserted between the first and second parts 3, 4 of the insert 2, thus forming an intermediate layer allowing to glue said first and second parts 3, 4 of the insert to one another.

Thus, according to this first embodiment, the injected polymer allows both to form a polymeric layer 5 which coats the insert, and to form an adhesive layer which glues the first and second parts 3, 4 of the insert to one another. According to a second embodiment, the insert provided is presented in one single part. The first and second parts 3, 4 of the insert are connected to one another before the moulding operation.

According to this embodiment, the first and second parts can be manufactured separately from one another, then glued by means of an adhesive, such as a glue, a dental cement, or any other gluing means adapted for this purpose.

Alternatively, the first and second parts 3, 4 of the insert 2 can be assembled during their manufacture. In this case, and preferably, the first part or the second part of the insert comprises a polymer able to be crosslinked, in particular under the effect of light, UV rays, or temperature, so as to form a rigid polymeric network. This crosslinked polymer allows to fix the two parts of the insert to one another. More specifically, the first and second parts 3, 4 of the insert 2 are first put into contact with one another, preferably by applying a high mechanical force, then the polymer(s) is/are crosslinked, in order to form a rigid connection between the two parts of the insert. The ends of the first and second parts of the insert are thus interlinked in the crosslinked polymeric network.

The one-piece insert is then placed in the mould, and the moulding operation is carried out.

Moreover, it is possible to cover one or more surfaces of the insert during the casting of the polymer.

According to a first embodiment, the insert 2 is positioned in the centre of a hollow part of the mould, and the polymeric material is injected into all of the remaining volume. Under these conditions, the whole surface of the insert 2 is covered with polymeric material forming the polymeric layer 5. The insert is advantageously of cubic, rectangular parallelepiped, or cylindrical shape.

According to a second embodiment, the insert 2 is of a general rectangular parallelepiped shape, and the material is injected into only one part of the volume of the hollow part of the mould.

According to a preferred embodiment of the invention, the mandrel 6 is advantageously made in the same moulding operation as the block 1, according to what has been described above.

To do this, a mould is provided, comprising, further to the previous hollow part, a second hollow part having the imprint of the mandrel to be made. The second hollow part of the mould is connected to the first hollow part.

Then, the following steps are carried out:
positioning of the insert 2 made beforehand in the first hollow part of the mould,
injection of a polymeric material, into the mould to cover at least one surface of the insert 2, and to fill the imprint of the second hollow part of the mould, in order to form the block 1,
demoulding of the block 1.

Thus, according to this embodiment, the mandrel is made of the same material as the polymeric layer. This means that the material of the mandrel has the same composition as the material of the polymeric layer.

The block obtained is CAD/CAM machined to make the dental prosthetic element comprising the inlay-core and the crown.

Contrary to the dental prosthetic elements of the state of the art, wherein the inlay-core is glued with the crown after having machined separately the inlay-core and the crown, in particular with a gluing cement, the CAD/CAM block of the invention is of one single holding, and consequently, the machining of the inlay-core and of the crown is done on one single part, in one sole and single machining operation.

In addition, the dental prosthetic element obtained after machining is itself also of one single holding. Therefore, the step of gluing the inlay-core and the crown is avoided.

These advantages allow to increase the speed of the method and to decrease the production costs.

The invention claimed is:

1. A block for CAD/CAM machining of a dental prosthetic element comprising:
an insert wherein the dental prosthetic element is intended to be machined,
a polymeric layer covering at least one surface of the insert,
a mandrel fixed to the insert,
wherein the insert comprises two parts connected to one another, of which:
a first part configured to be machined to form an inlay-core, said first part comprising a composite material comprising one-directional reinforcing fibres that are perpendicular to the length of a second part of the insert,
a second part configured to be machined to form a crown, said second part having no reinforcing fibres and comprising a material comprising one or more mineral fillers.

2. The block according to claim 1, wherein the first part of the insert is glued to the second part of the insert by an adhesive layer arranged between said first and second parts.

3. The block according to claim 1, wherein the composite material of the first part and/or of the second part of the insert comprises a crosslinked polymer, said first and second parts being fixed to one another by said crosslinked polymer.

4. The block according to claim 3, wherein the reinforcing fibres of the first part of the insert are longitudinal.

5. The block according to claim 4, wherein the composite material of the first part of the insert comprises at least one polymer, and the one-directional reinforcing fibres are buried in said polymer.

6. The block according to claim 5, wherein the one-directional reinforcing fibres of the composite material of the first part of the insert are chosen from the group consisting of glass fibres, quartz fibres, silica fibres, and mixtures thereof.

7. The block according to claim 6, wherein the one-directional reinforcing fibres of the composite material of the first part of the insert represent between 50% and 85% by weight with respect to the weight of said composite material of the first part of the insert.

8. The block according to claim 7, wherein the material of the second part of the insert is a composite material comprising at least one polymer and mineral fillers buried in said polymer.

9. The block according to claim 8, wherein the mineral fillers of the material of the second part are chosen from the group consisting of silica, glass, ceramic, radio-opaque particles, and mixtures thereof, and wherein said fillers of the material of the second part represent between 50% and 85% by weight with respect to the weight of said composite material of the second part of the insert.

10. The block according to claim 1, wherein the reinforcing fibres of the first part of the insert are longitudinal.

11. The block according to claim 1, wherein the composite material of the first part of the insert comprises at least one polymer, and the one-directional reinforcing fibres are buried in said polymer.

12. The block according to claim 1, wherein the one-directional reinforcing fibres of the composite material of the first part of the insert are chosen from the group consisting of glass fibres, quartz fibres, silica fibres, and mixtures thereof.

13. The block according to claim 1, wherein the one-directional reinforcing fibres of the composite material of the first part of the insert represent between 50% and 85% by weight with respect to the weight of said composite material of the first part of the insert.

14. The block according to claim 1, wherein the material of the second part of the insert is a composite material comprising at least one polymer and mineral fillers buried in said polymer.

15. The block according to claim 1, wherein the mineral fillers of the material of the second part of the insert are chosen from the group consisting of silica, glass, ceramic, radio-opaque particles, and mixtures thereof.

16. The block according to claim 1, wherein the fillers of the material of the second part of the insert represent between 50% and 85% by weight with respect to the weight of said composite material of the second part of the insert.

17. The block according to claim 1, wherein the polymeric layer covers all of the insert such that the block has a cubic or parallelepiped shape.

18. A one-piece dental prosthetic element machined from the block according to claim 1, comprising an inlay-core, comprising a composite material comprising one-directional reinforcing fibres, said inlay-core being surmounted by a crown, with no reinforcing fibres, and comprising a material comprising one or more mineral fillers, said one-directional reinforcing fibres being perpendicular to the length of the crown.

19. A method for manufacturing a dental prosthetic element, comprising the following steps:
implementation of a block according to claim 1, and
CAD/CAM machining of the block, thereby obtaining the dental prosthetic element,
wherein said dental prosthetic element comprises an inlay-core made of a single part constituted by a post surmounted by a core build-up, and a crown, and
wherein said CAD/CAM machining of the block comprises machining the CAD/CAM block in a single machining operation using the block as the only block in the method, and wherein machining of the first part provides the inlay-core, and machining of the second part provides the crown.

20. The method according to claim 19, wherein the dental prosthetic element is manufactured in one piece in one single assembly comprising the inlay-core and the crown.

\* \* \* \* \*